United States Patent [19]

Greve et al.

[11] Patent Number: 5,072,640

[45] Date of Patent: Dec. 17, 1991

[54] CUTTING APPARATUS FOR PLASTIC CONVEYOR MODULES

[75] Inventors: Christopher G. Greve, Covington; Ronald M. O'Connor, Jefferson, both of La.

[73] Assignee: The Laitram Corporation, New Orleans, La.

[21] Appl. No.: 516,522

[22] Filed: Apr. 30, 1990

[51] Int. Cl.⁵ .............................................. B26D 5/40
[52] U.S. Cl. ........................................ 83/208; 83/369; 83/370; 83/454
[58] Field of Search ................. 83/208, 452, 454, 369, 83/370, 652, 657

[56] References Cited

U.S. PATENT DOCUMENTS

| | | | |
|---|---|---|---|
| 1,085,356 | 1/1914 | Raffel | 83/370 |
| 2,890,750 | 6/1959 | Depken | 83/370 X |
| 3,552,252 | 1/1969 | Maxey et al. | 83/369 X |
| 3,670,614 | 6/1972 | Streckert | 83/369 X |
| 3,715,944 | 2/1973 | Knechtel et al. | 83/369 X |
| 3,745,864 | 7/1973 | Watson | 83/369 X |
| 4,727,787 | 3/1988 | Schlosser | 83/369 X |
| 4,796,499 | 1/1989 | Achelpohl | 83/155 X |

FOREIGN PATENT DOCUMENTS

| | | | |
|---|---|---|---|
| 1095254 | 12/1960 | Fed. Rep. of Germany | 83/454 |
| 109697 | 4/1990 | Japan | 83/369 |

*Primary Examiner*—Timothy V. Eley
*Attorney, Agent, or Firm*—Laurence R. Brown; James T. Cronvich

[57] ABSTRACT

Apparatus and method for quickly and accurately cutting conveyor belt modules is disclosed. A guide track supports and provides a path past a cutting location for the modules that are to be cut. The modules are stopped after a selected amount of width of the module to be cut has passed the cutting location. A cutting blade which has a length extending orthogonal to the direction of travel of the modules is aligned by a die which provides a guide for the cutting blade and also accurately positions the modules prior to cutting. The blade is moved or activated by a means such as a hydraulic damped pneumatic cylinder at a controlled speed so as to cut through the modules. A cylindrical shaped anvil is located substantially across the length of the module being cut such that it provides support to the modules along a line directly opposite the length of the blade as the blade cuts through the modules. However, being cylindrical the support provided by the anvil to the module decreases from the line of support in both directions along the travel path.

14 Claims, 10 Drawing Sheets

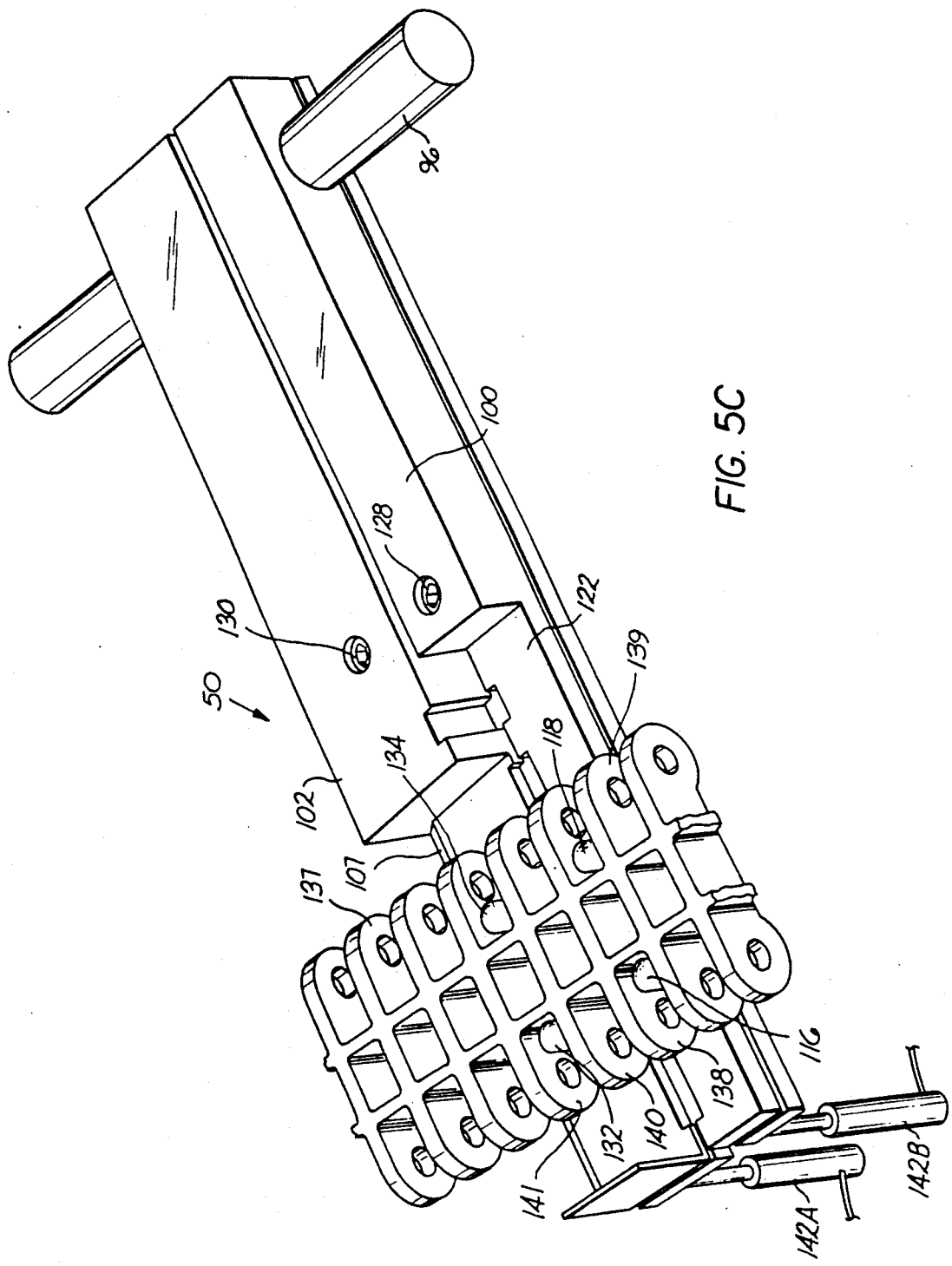

CUTTING APPARATUS FOR PLASTIC CONVEYOR MODULES

TECHNICAL FIELD

This invention relates to apparatus and methods for cutting conveyor modules to a selected width and more particularly to such apparatus and methods for cutting integrally molded plastic modules in such a manner that there is no wasted plastic due to a saw kerf, and in such a manner that avoids fracturing and breaking of the modules during the cutting process. The modules are automatically measured to a selected width and cut such that all the modules necessary for a particular conveyor belt may be cut to size with minimum labor requirements.

BACKGROUND

A typical modular conveyor belt is disclosed in U.S. Pat. No. 3,870,141 issued to J. M. Lapeyre on Mar. 11, 1975. According to this patent a large number of modules formed by injection molding are pivotally connected to one another to form a conveyor belt of a desired length. The link ends of one module are intermeshed and pivotally connected by means of a pivot rod to the link ends of another module until an entire belt having a desired length and width is formed. U.S. Pat. No. 4,213,527 issued June 22, 1980 to J. M. Lapeyre, et al, discloses an extruded module for forming a link conveyor belt.

Still other modular conveyor belt patents by Lapeyre and others are owned by the same assignee as the present invention which might be considered relevant to the present invention include: U.S. Pat. No. 4,832,183 entitled "Conveyor Belt Having Insertable and Selectable Conveying Member" issued May 23, 1989: U.S. Pat. No. 4,832,187 entitled "Modular Center Drive Conveyor Belt" issued May 23, 1989; and U.S. Pat. No. 4,688,670 entitled "Flat Top Conveyor Belt" issued Aug. 25, 1987.

The above referenced patents represent a typical selection of different modules used to construct conveyor belts. In almost every one of the different modular structures, belts of varying widths are fabricated by sawing at least one module of every other row to a selected width. Unfortunately, such sawing often results in the loss of an unacceptable amount of plastic material due to the saw kerf. At the very least, the saw blade leaves a rough and unacceptable surface on the cut area.

Thus, a review of the prior art reveals that to date there has not been a simple and inexpensive technique to cut modules which technique was particularly designed for the purposes of providing a smooth cut surface and without loss of material.

Therefore, it is an object of the present invention to provide apparatus and methods for accurately and quickly cutting modules to selected width(s).

It is another object of the present invention to provide such apparatus and methods for making such cuts with minimal or no loss of plastic material.

It is yet another object to provide apparatus and methods which allows the multiplicity of modules to be cut with substantially little or no labor requirements.

SUMMARY

These and other objects and advantages will be obvious and will in part appear hereinafter, and will be accomplished by the present invention which provides apparatus and methods for cutting conveyor belt modules to a selected width in a rapid and accurate manner. According to a preferred embodiment of the invention, a guide track provides support and a path to a cutting location where the modules are cut by a blade having a length extending orthogonal to the direction of travel of the modules. In the preferred embodiment, the modules encounter a physical stop and also use an optical sensor which detects the presence of the modules such that the amount of the module width which has passed the cutting location is controlled. An alignment die is provided to accurately position the modules prior to cutting and to accurately guide the cutting blade during the cutting process. The blade is moved by an activating means such as a constant speed electrical motor or a hydraulically damped pneumatic cylinder such that the blade passes through the modules at a constant speed. An anvil is provided across the length of the modules to provide support to the modules along a line directly opposite the length of the blade such that when the blade cuts through the module, support is provided directly opposite the blade. It is important to note however, that in the preferred embodiment the anvil has a cylindrical shape with its axis parallel to the length of the blade for cutting through the modules, thus, the anvil has a shape such that support of the modules decreases from the line of support opposite the cutting blade in both directions along the travel path. This allows flexing of the module and prevents fracturing of the module.

BRIEF DESCRIPTION OF THE DRAWINGS

The above features of the present invention will be more clearly understood from consideration of the following description in connection with the accompanying drawings in which:

FIG. 5C shows the alignment die of FIG. 5B in the compressed position with the module similar to FIG. 2 supported by the alignment die.

BEST MODE OF CARRYING OUT THE INVENTION

Figure 1:
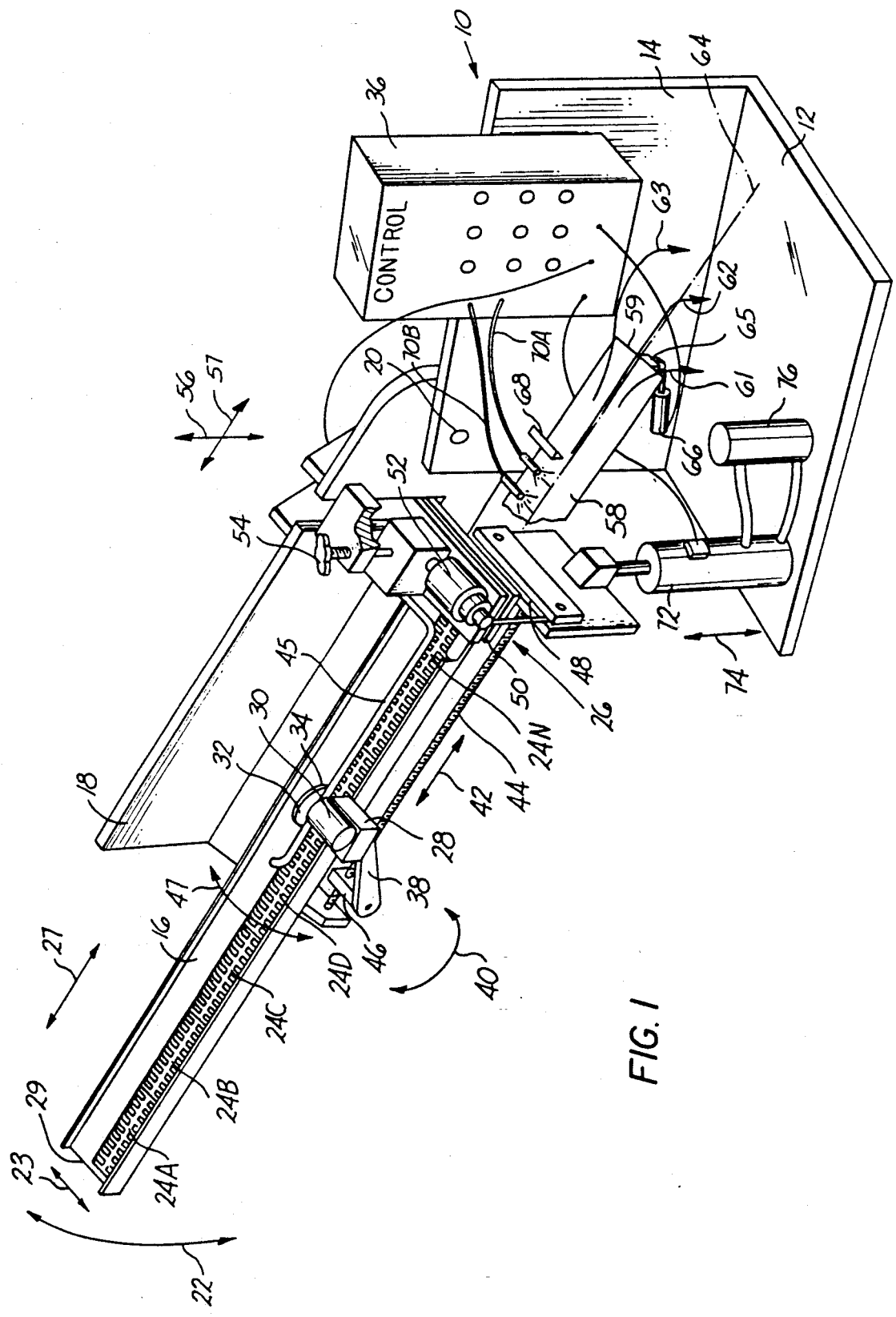
FIG. 1 is a perspective view of one embodiment of the apparatus of this invention for accurately and quickly cutting a plurality of modules.

Referring now to FIG. 1, there is a perspective view of the apparatus of this invention. As shown, the apparatus is generally supported by a support base 10 having a horizontal portion 12 and a vertical portion 14. A guide track 16 for supporting a plurality of modules laid end to end is supported by a structure 18 which may be bolted or otherwise physically secured to portion 14. Alternately, structure 18 may be pivotally connected to vertical portion 14 at a pivot point 20 so as to allow the guide track 16 to be positioned at any selected angle as indicated by arcuate double-headed arrow 22. In addition, to accommodate modules of different lengths (i.e., the pitch or distance between pivot axes) the width of guide track 16 is made adjustable in the preferred embodiment as indicated by double headed arrow 23. Furthermore, in some applications it may be desirable to run two or even three modules side by side so as to cut more than one module at a time.

As shown, a plurality of plastic modules 24A, through 24N are supported in said guide track such that they extend to the cutting station 26 and under the drive and feed mechanism 28. It should also be appreciated that the modules may be fed or supplied to guide track 16 by hand or alternately a hopper (not shown) may be mounted at the end 29 of guide track 16 to provide a continuous supply of modules. Although in a simplified embodiment of the apparatus of the present invention, the plurality of modules 24A through 24N may move along the guide track by the force of gravity alone, the drive and feed mechanism 28 as shown assures a more constant and regular speed of movement of the modules. In addition, the drive and feed mechanism 28 allows the stream of modules to be moved in a direction indicated by arrow 27 with at least two selective speeds to facilitate operation of the apparatus. The drive and feed mechanism 28 may also be reversed so as to retract or move the modules backward thereby creating a gap or separation between the modules being cut and the next module in line. This gap prevents interference with the module being cut.

In the preferred embodiment, the drive apparatus 28 includes a variable motor 30 which drives a control wheel 32 having a rubber perimeter 34. The speed of the variable speed reversible motor 30 is selected by a control panel 36 to be discussed hereinafter. Also as shown, the drive apparatus 28 is mounted on a support structure having a pivot arm 38 in such a way that the structure 28 bears against the line of modules 24A through 24N as a result of the weight of the motor, the wheel and the support structure. Also as shown, the pivot arm 38 allows the drive and feed mechanism 28 to rotate in a direction as indicated by the arcuate double-headed arrow 40. In addition, since various modules have different widths and since the wheel 32 should always bear against the module next in line to be cut, it is often desired that the location of the drive mechanism 28 be positioned along the drive track at various locations as indicated by the straight double-headed arrow 42. This variable location may be accomplished by any suitable means such as detents along a rod, or as shown, by a lead screw 44 and a threaded block 46 which moves along the lead screw and consequently moves the drive mechanism 28.

Also as shown, there is an elongated hold down rod 45 extending from cutting station 26 to a location beyond the drive and feed mechanism 28. Further, if desired, hold down rod 45 may be automatically lifted out of the way at selected times during the cutting sequence as indicated by arcuate arrow 47. Cutting station 26 located at the bottom end of the guide track 16 includes a cutting blade 48 and alignment die 50 and a cylindrically shaped and vertically adjustable anvil 52 which is typically made of plastic, but may be made of metal or other suitable material. However, it is important to note that the cutting station 26 comprised of the blade 48, alignment die 50 and anvil 52 may be accurately adjusted "vertically" with respect to each other by means of a fine adjustment screw such as illustrated by the simple adjusting screw 54 and indicated by double headed arrow 56. It will be appreciated that although the very simple adjusting screw 54 is illustrated in this embodiment the necessary adjustments may be accomplished by more complex means, and the mechanism positioned in other locations. To achieve "horizontal" positioning the blade 48 has limited rotational and horizontal movement. The final precise horizontal alignment of blade 48 as indicated by double arrow 57, is accomplished by ceramic alignment balls installed in each alignment die as will be discussed hereafter.

Also shown is discharge chute 58, having an exit end 59, which receives the cut modules and directs the modules to automated machinery, or a waiting bin or box for shipping. As indicated by the triple arrows 61, 62 and 63 the discharge chute 58 may direct certain size modules in one direction such as indicated by arrow 61, and different sized modules in another direction box as indicated by arrow 63. The left over portion or remainder of the modules may vary in size, and typically drop into still another bin or box as indicated by arrow 62. The discharge chute 58 accomplishes this three way separation of different sized modules by rotating in both directions about pivot axis 64 while at the same time end 59 of the discharge chute is slightly dropped. This action is accomplished by a mechanical linkage (indicated by box 65) driven by a motor or solenoid 66 which in turn is controlled by the control box 36.

It will be appreciated that various types of sensors may be used to indicate that the desired amount of module has passed the cutting station such that when the blade is activated the module will be cut at the right length. In the preferred embodiment, a simple and adjustable mechanical stop 68 is also used wherein the module already detected by a sensor (such as for example fiber optic sensor 70A) slides until it contacts and is stopped by the mechanical stop and is then cut by blade 48. Due to inertia and the reaction time of the mechanism, the speed of the modules down the guide track 16 must be reduced if only an electrical or optic sensor is used. Thus the use of a mechanical stop allows a significantly faster speed rate. If the modules are to be cut to more than one selected width, other stops or sensors are necessary. Therefore, as shown there is also a second electrical/optical sensor such as for example fiber optic sensor 70B which according to a preferred embodiment of the present invention senses the presence of the module after the first cut so as to slow and stop motor 32 of drive mechanism 28 which in turn slows and stops the movement of the modules when the correct amount of width has passed. Thus, the second cut produces a portion of a module having a different and usually lesser width. Since the "second" cut is typically selected to produce a lesser module portion than the "first" cut, the modules can move down the guide 29 at the slower rate necessary when using an electrical/optical sensor without slowing the total operation as much as would occur if the longer cut did not take advantage of a mechanical stop. It will be appreciated of course that rather than using an electrical/optical sensor 70B, two mechanical stops (not shown) could also be used for controlling the width of modules passing the cutting station 26. However, additional mechanism for moving the second stop out of the module path subsequent to making the "second" cut and prior to making the "first" cut would be necessary.

It will also be appreciated that the output of the optical sensors 70A and 70B are monitored by the control box 36 which then provides a signal to a hydraulic actuator for the feed-side of the alignment die (details of the alignment die will be discussed in detail hereafter). After the hydraulic actuator operates, a second hydraulic actuator for the discharge side of the alignment die is actuated followed by actuation of the power actuator 72 which drives the blade as indicated by the double-headed arrow 74 in a manner so as push blade 48 through the module under the anvil 52. More specifically, in the preferred embodiment, to cut modules to a single size, the sensors 70A and 70B are monitored by control box 36 and cooperate with mechanical stop 68 such that when sensor 70A detects a portion of a module, the motor 30 of feed and drive apparatus 28 slows and/or stops, the module hits the mechanical stop 68 and is stopped, and the feed-side of the alignment die positions and clamps the module. If the detected module portion is the drop piece or remainder material (often waste) from the last cut module, it will fall away and clear sensor 70A and the feed and drive apparatus 28 will start up again. This occurs because the alignment die always draws the module backwards. After a brief pause to confirm the presence of a module for cutting, the discharge side of the alignment die precisely positions the part and the cutting cycle begins. When the cut is complete, the system is incremented and the blade retracts. When the blade is fully retracted, the feed motor starts again and the process repeats.

As was mentioned earlier, the feed motor 30 retracts slightly and the hold-down wire 45 lifts when a module is detected. This leaves a space between the module being cut and the following module thereby allowing the module being cut to flex as the cutting progresses. The other end is also free since the module was pulled slightly away from mechanical stop 68 when the alignment die positioned it.

In the preferred embodiment as shown, hydraulic damped pneumatic actuator or cylinder 72 provides the power for cutting the modules. However, it will be appreciated that other means of driving the cutting blade, such as for example a constant speed electrical motor, could be used. In the preferred embodiment in addition to the resistance to movement offered by the module being cut, the pneumatic actuator 72 is further resisted by a hydraulic damping such that the force required to overcome the hydraulic damping is substantially greater than the relatively negligible forca required to push the blade through the module. Thus, since the power necessary to cut the module is small with respect to the over all force necessary to move the hydraulic damper, variations in the cutting resistance of the module due to size, material, temperature, etc. will not greatly affect the speed of the movement of the pneumatic actuator 72. Further as shown, the pneumatic actuator 72, is provided air pressure by compressed air system 76.

Figure 2:
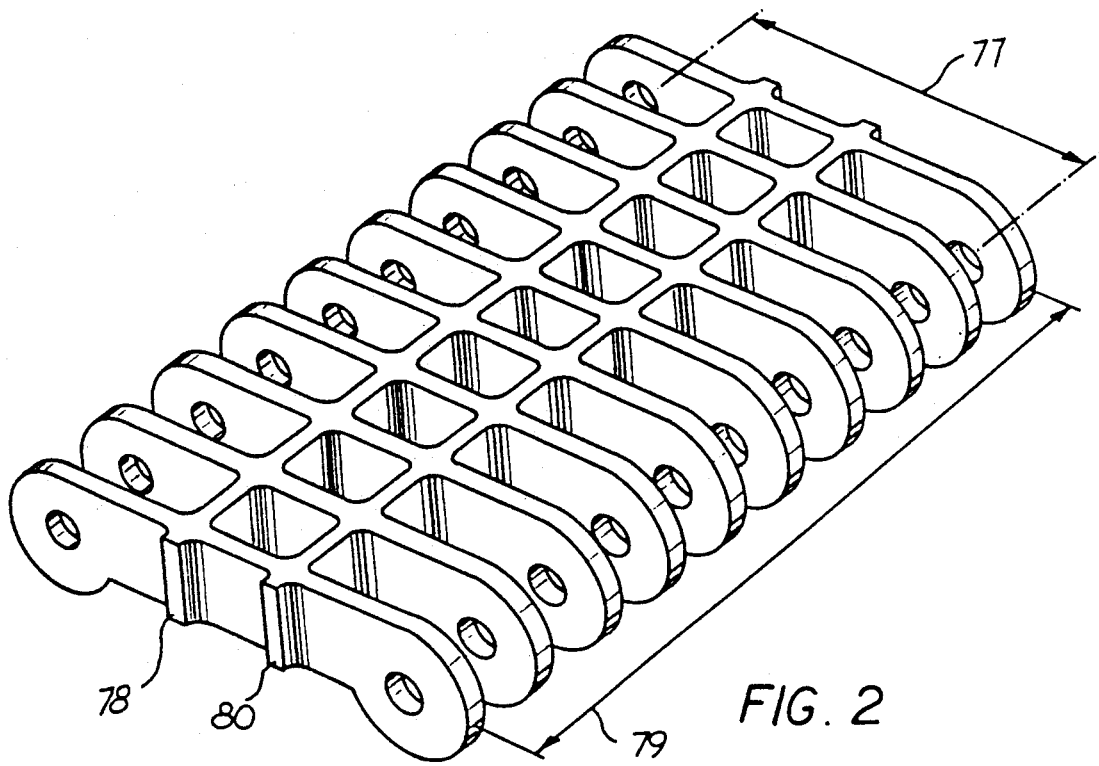
FIGS. 2 and 3 show sections of typical plastic conveyor modules which may be readily and accurately cut by the apparatus of this invention.
Figure 3:
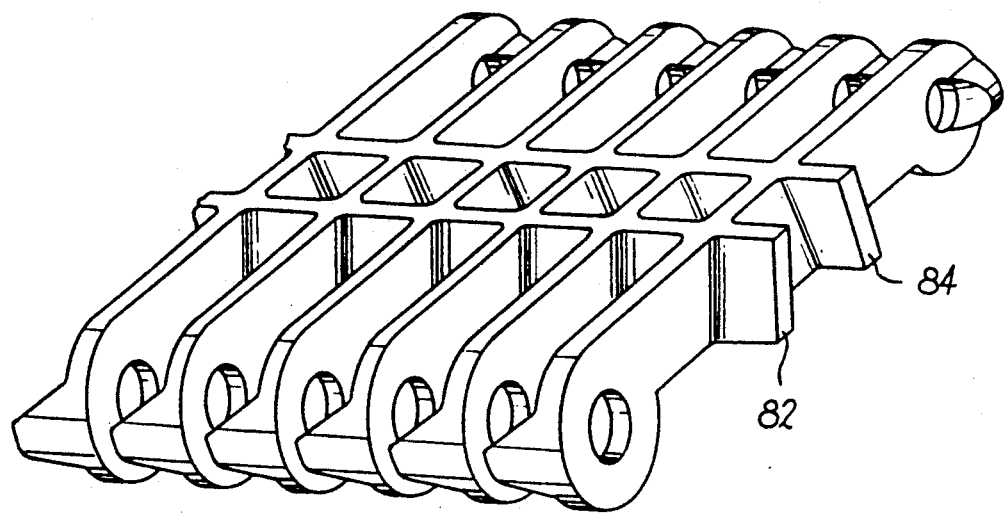

Referring now to FIGS. 2 and 3 there are shown typical modules suitable for being cut or divided by the apparatus of this invention. In the following discussion and as will be appreciated by those skilled in the art, the "length" of a module is that dimension which corresponds to the direction of travel of a belt made up of such a multiplicity of modules as indicated by double headed arrow 77 located between the two pivot axes. The "width" of the module is that dimension which is perpendicular to the direction of travel as indicated by double headed arrow 79. Thus, it is seen that unlike normal convention, the "length" dimension 77 is usually smaller than the "width" dimension when referring to conveyor modules. The modules shown in FIGS. 2 and 3 are substantially similar in appearance except that the center cross-members 78 and 80 of FIG. 2 are basically perpendicular and at right angles with respect to the individual links such that a square box beam is formed for supporting the modules. In FIG. 3 cross-members 82 and 84 are similar but are at an angle and are suitable for receiving the tooth of a driving sprocket. It should be noted, however, and as will be discussed in detail later, that each of these modules whether or not similar in appearance and size may require a different alignment die to precisely locate the module. This is necessary because of the interaction of the pins of the alignment die and the various surface characteristics of the module being cut.

Figure 4A:
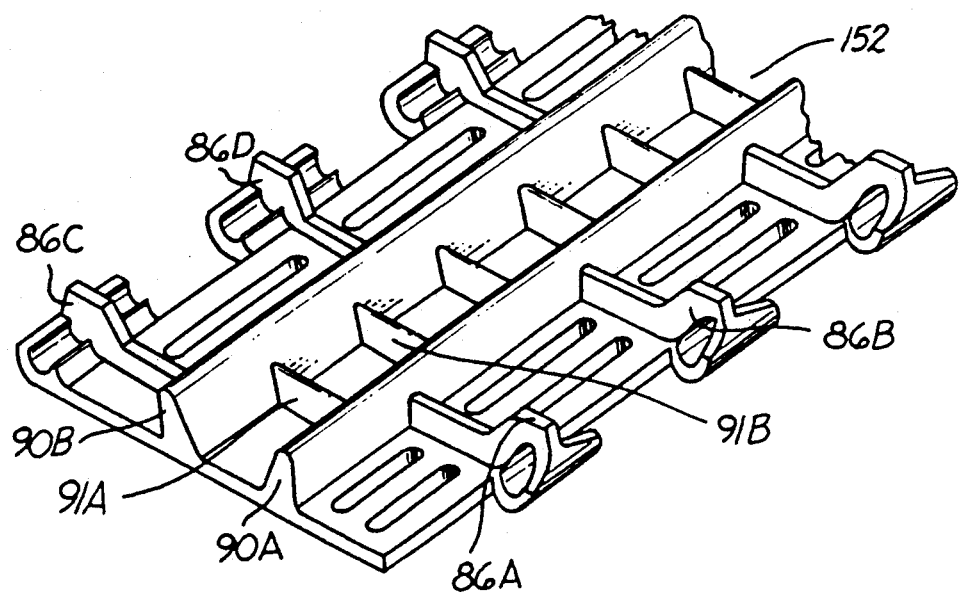
FIGS. 4A and 4B show bottom and top perspective views respectively of another type of module suitable for being accurately and speedily cut by the apparatus of this invention.
Figure 4B:
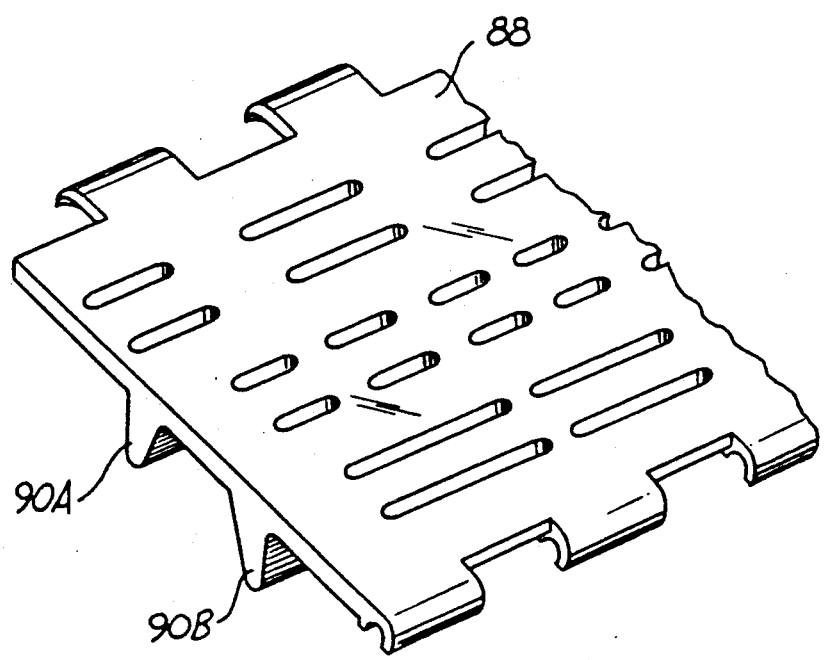

FIGS. 4A and 4B show a bottom and top perspective of a substantially different type of plastic module also suitable for cutting on the apparatus of this invention. The module shown in FIGS. 4A and 4B is constructed with widely spaced link ends such as link end 86 and has a flat top surface 88 which can be perforated as shown or may be solid. As will be discussed hereinafter with respect to alignment dies 50, locator pins cooperate with structure characteristics of the module to provide precise positioning prior to the module being cut. It should also be appreciated that this module, as is true for most modules, may be cut from the top side or bottom side if there are surface characteristics which will cooperate with the locator pins to provide precise positioning. For example, the module of FIGS. 4A and 4B could be moved through the cutter of this invention upside down as shown in FIG. 4A. If the modules were to be moved through the cutter with this orientation, the locator pins provided by the alignment die would cooperate with the perforation in top surface 88. However, although it is believed that cutting of the perforated module in this manner would provide excellent results, it will be appreciated that it would be impossible to cut similar modules which have a solid top 88 rather than a perforated top. Consequently, a more likely choice would be to move the modules through the apparatus with their top side up as shown in FIG. 4B. Of course, if the modules are selected to run in this manner, the locator pins of the alignment die will be positioned to cooperate with the characteristics of the under side of the module such as ribs 86A, 86B, 86C and 86D, cross-members 90A, 90B and the center connecting members 91A and 91B. Consequently, it would make no difference if the top was solid or perforated. Thus, it is seen that the module cutter of this invention is suitable for cutting substantially every type of plastic module presently commercially available.

To accommodate such variable types and shapes of modules, the present invention provides for the use of interchangeable alignment dies each one designed specifically for the particular module to be cut. The alignment dies are similar with each other except that pins or other structure characteristics are varied according to the structure characteristics of the module to be cut.

Figure 5A:
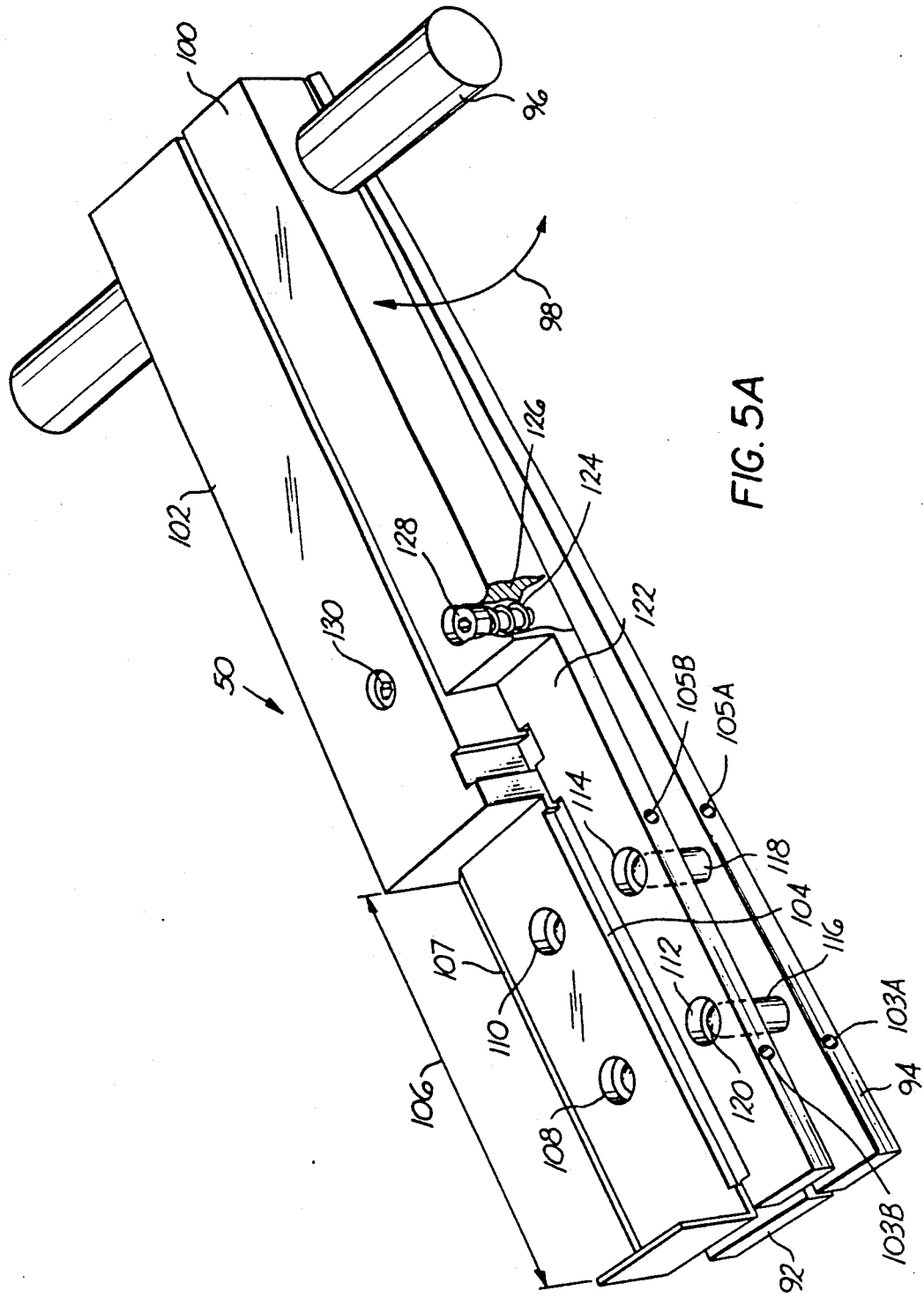
FIG. 5A shows an alignment die in the relaxed position suitable for supporting a module such as shown in FIG. 2.

Referring now to FIG. 5A, there is shown a typical alignment die 50 for use with the apparatus of this invention. The die shown in FIG. 5A, as will be seen hereinafter, is designed to operate with modules having the size and characteristics shown in FIG. 2. As shown, the die includes a first pair of bottom plates 92 and 94. These plates are separate from each other and are able to rotate individually with respect to the pivot bar 96 as indicated by double-headed arcuate arrow 98. Also mounted to the pivot bar 96 are two top plates 100 and 102. Thus, it is seen that top plate 100 operates in conjunction with bottom plate 94, and top plate 102 operates in conjunction with bottom plate 92. Further as shown, the top and bottom plates 92, 94, 100 and 102 define between themselves a slot 104 through which a cutting blade 48 moves. This slot is dimensioned so as to carefully guide and maintain the cutting blade at a precise location with respect to alignment guide 50. The precise location of the blade 48 with the alignment die 50 is accomplished by carefully adjusting the position of ceramic bearings (not shown in FIG. 5A) by set screws accessible by adjusting ports 103A, 103B, 105A and 105B. It will be appreciated that bottom plate 92 and top plate 102 also include similar ports (not shown) to accommodate a similar pair of ceramic bearings. As shown, top plate 102 defines a passage indicated by the double-headed arrow 106 for receiving and allowing a module to move past the cutting slot 104. To facilitate movement of a module onto top plate 102 of the alignment die 50, receiving edge 107 of top plate 102 is beveled. Also as seen, top plate 102 defines two apertures such as for example apertures 108 and 110 which receive pins mounted to the bottom plate 92. In a similar manner top plate 100 also includes two apertures such as apertures 112 and 114 which receive pins such as pins 116 and 118 respectively which are mounted to the bottom plate 94. As shown in the FIG. 5A, it is seen that the tops of the pins such as top 120, do not pass completely through the aperture 112 such that they do not extend above the surface area 122 of the top plate 100. Although FIGS. 5A through 5D only show four pins (two for each top plate) it will be appreciated that a larger number of pins may be included if necessary to maintain the module so that it will not move during the cutting operation. Also as shown, top plate 100 is biased or urged away from bottom plate 94 by a resilient means such as spring 124 visible at cutout 126 in top plate 100. Spring 124 is held in place by the shoulder screw 128 which also helps maintain the top and bottom plates in alignment. In a similar manner shoulder screw 130 maintains another spring (not shown) in place to maintain top plate 102 in an open position and in alignment with respect to bottom plate 92. These springs cooperate with their respective bottom plates and are independent such that the bottom plate 94 may be moved closed independently from the bottom plate 92. Likewise, plate 92 could be moved closed while bottom plate 94 remains in an open position. The purpose of such independent movement will be discussed hereinafter.

Figure 5B:
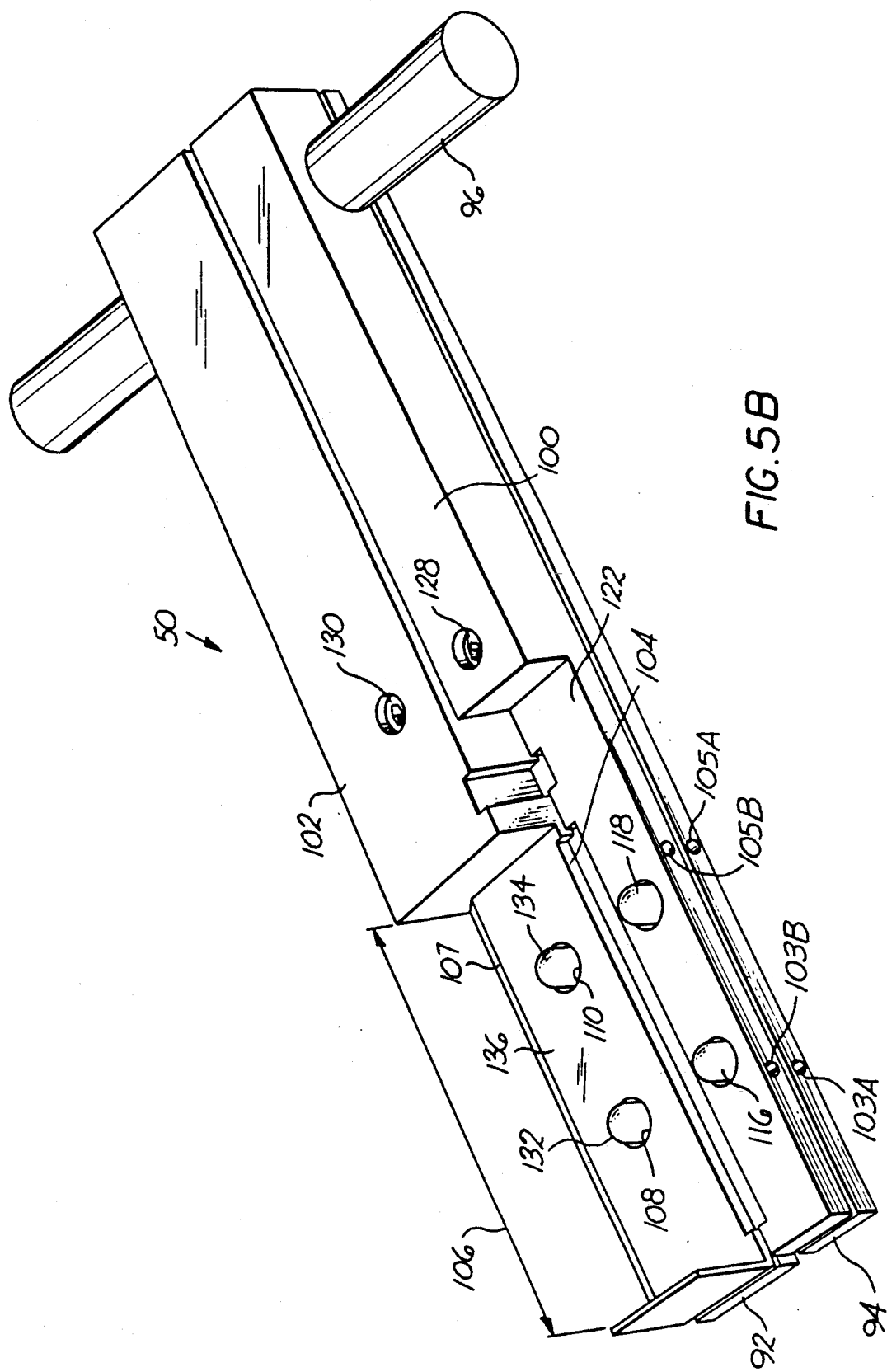
FIG. 5B shows the alignment die of FIG. 5A in the compressed position.

Referring now to FIG. 5B there is shown the alignment die 50 as discussed with respect to FIG. 5A in the compressed or closed position, that is, plate 94 has rotated upward with respect to plate 100 such that the alignment pins, such as for example alignment pins 116 and 118, extend well above the surface area 122 of top plate 100. In a similar manner, pins 132 and 134 also extend well above the top surface 136 of top plate 102. As will be better understood from the following discussion, when the plates are moved to this position they are capable of maintaining a module in a precise location with respect to the blade slot 104 such that the module may be precisely cut.

Referring now to FIG. 5C there is shown the alignment die such as FIG. 5B with a module 137 somewhat similar to the type shown in FIG. 2 in place on the alignment die prior to being cut. As can be seen, pins 116 and 118 are located with respect to the die such that they fit snugly between the elongated links 138 and 139 of the module. In a similar manner, pins 132 and 134 fit snugly between links 140 and 141. Thus, it is seen that alignment pins 116, 118, 132 and 134 force and hold the module in a precise location with respect to the two top sections of the die 100 and 102. Therefore, it should also be appreciated that because of the alignment the pins of the alignment die fit snugly between the module links, the top plates 100 and 102 also serve as stripper plates when the die is relaxed or opened. It has also been found that for some applications the actuator driven alignment dies move so fast that if carefully adjusted, it may be possible to eliminate both the mechanical type stop and optical sensors. If this type of arrangement is chosen, the pins in the alignment die stops the movement of the module and positions the module.

Although not visible in FIG. 1, both bottom portions 92 and 94 are individually activated (i.e. moved from the open to the compressed position) by pneumatic actuators shown schematically as simple actuators 142A and 142B. Of course, the actuator may be positioned substantially closer to the pivot bar 96 so as to be out of the way of the cutting blade mechanism and still operate effectively.

Figure 5D:
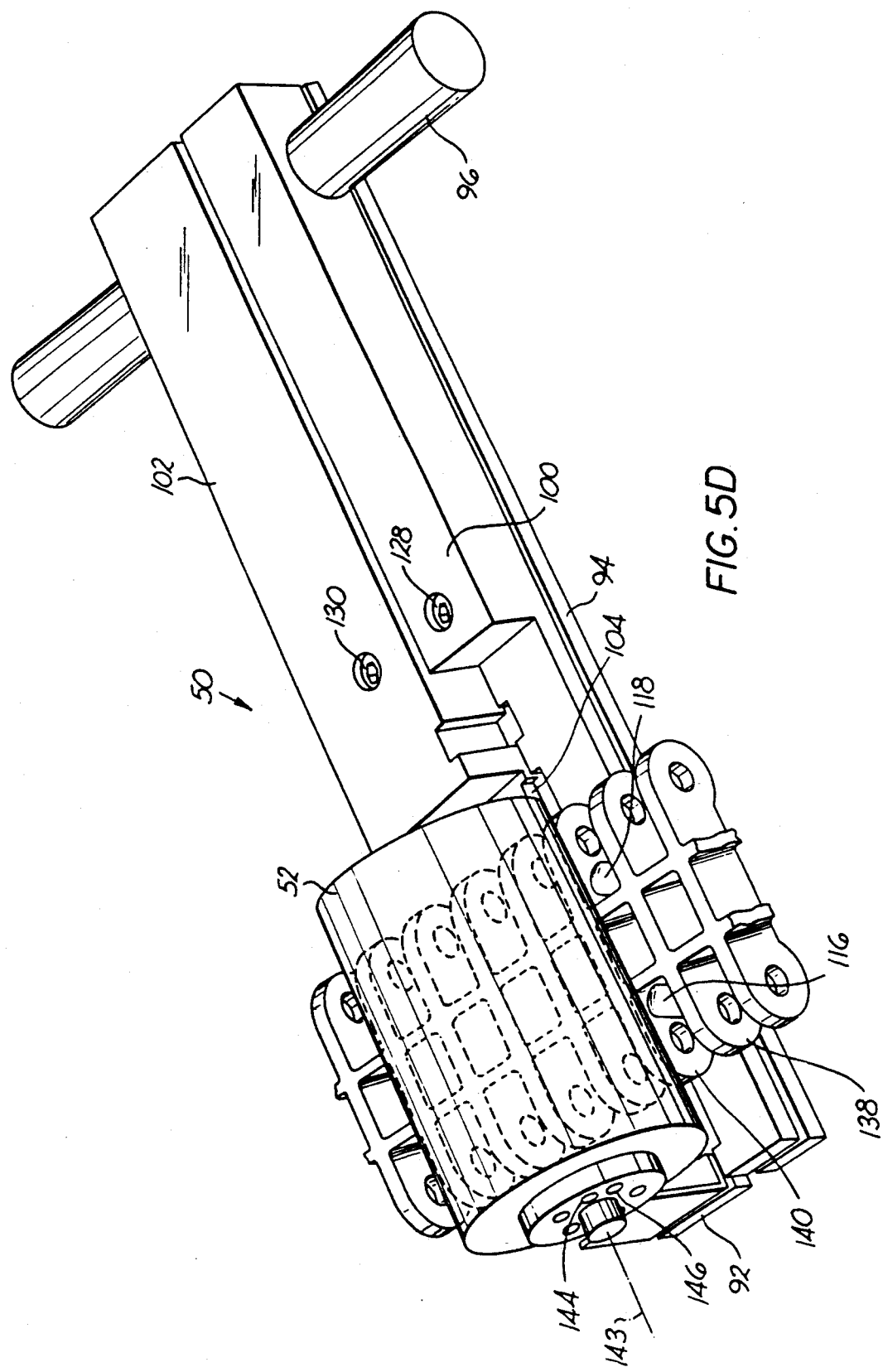
FIG. 5D shows the alignment die and the module in place with the cylindrically shaped anvil in position prior to the module being cut.

FIG. 5D shows the module and alignment die of FIG. 5C with anvil 52 for cutting in place. In a preferred embodiment, the anvil 52 is cylindrical shaped and rotates around a central axis 143 such that different areas around the perimeter of the anvil may be used as the support surface during the cutting of a module. In a preferred embodiment, an anvil made of a material such as Polyethylene, Delrin, etc. has been found very suitable. Also, as shown in the FIG. 5D the anvil may be rotated and held in position at various locations as indicated by the detents surrounding pivot axis 143, such as detents 144 and 146. In the embodiment shown in FIG. 5D, the cylindrical anvil 52 is shown as having a smooth surface. However, for certain types of modules longitudinal grooves located around the perimeter of the anvil for receiving the cutting blade 48 may provide a cleaner cut.

Thus, it will be appreciated that with the anvil in place and the alignment die 50 closed such that a module is held in a precise location with respect to the die, a blade passing through the blade slot 104 will always cut a module at a precise location between two adjacent links, such as links 138 and 140 of the module shown in FIG. 5D. It should be clear of course that the cut through the module could be made between any two adjacent links. And since the module is uniform and the pins are precisely placed the cut between the two adjacent links will always be at a precise location. It will also be appreciated that in a preferred embodiment, incorporating a feed and drive mechanism 28, the bottom portion of the feed side of the alignment die is adjusted and biased upward by a spring. Thus, the die is held lightly against the module to be cut thereby creating a friction fit that prevents the module from sliding through the cutting station due to gravity.

Figure 6A:
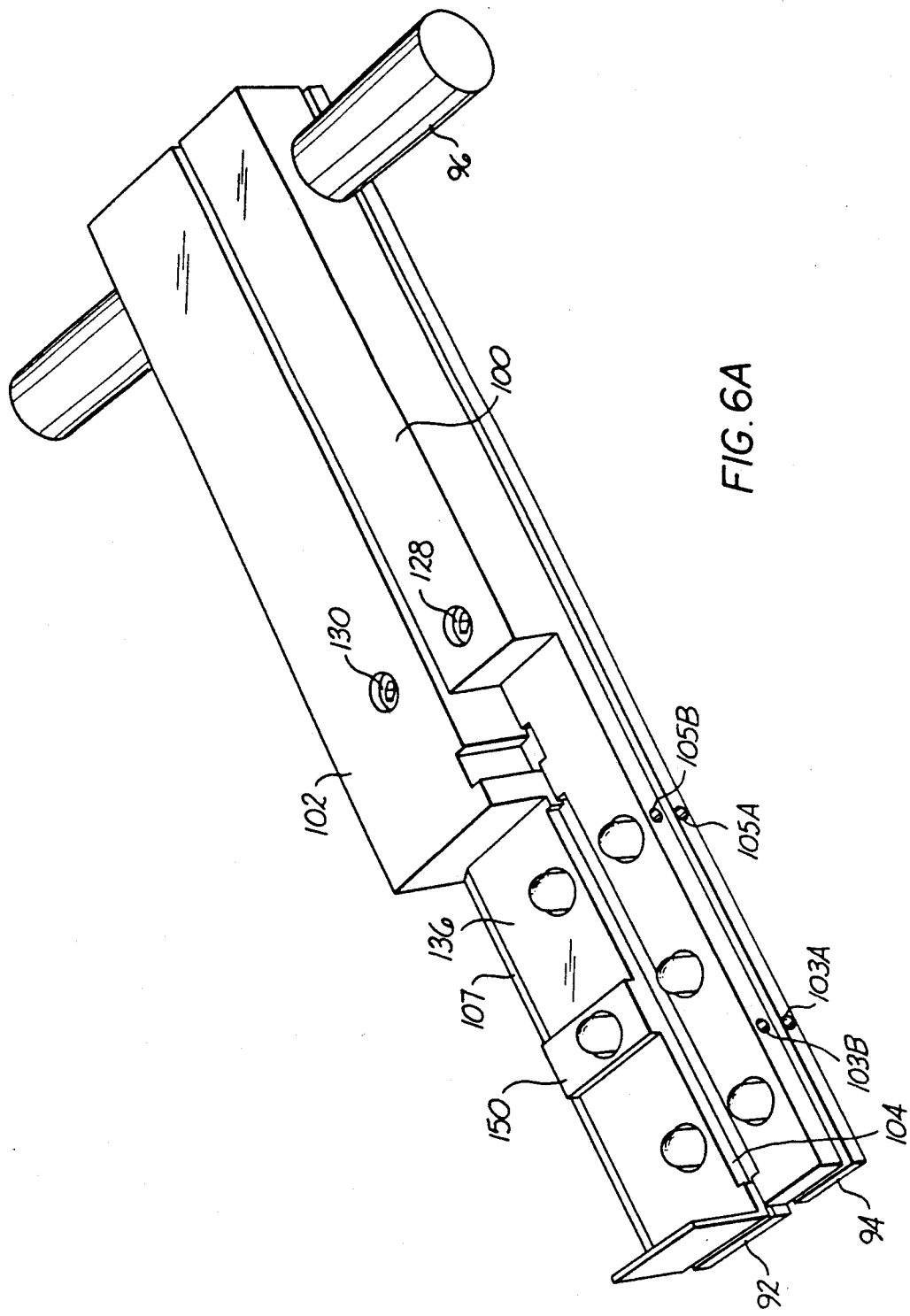
FIGS. 6A and 6B show a different alignment die in the compressed and relaxed positions respectively suitable for being used with modules of the type shown in FIGS. 4A and 4B.
Figure 6B:
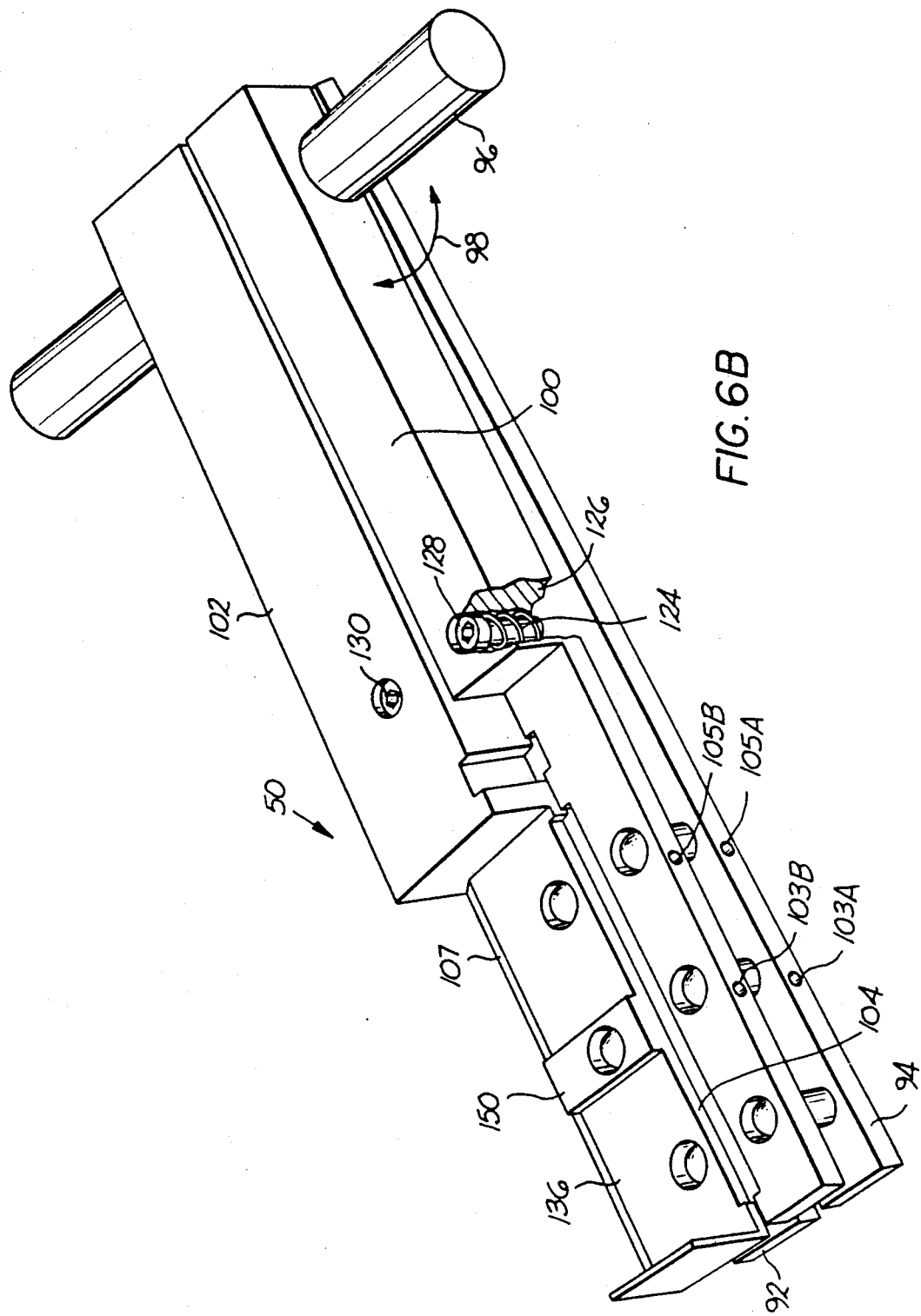

FIGS. 6A and 6B show an alignment die in the compressed and open positions respectively suitable for use with a module such as the module shown in FIGS. 4A and 4B, with the topside up as shown in FIG. 4B. It should be understood, that the alignment dies are easily interchangeable so that the apparatus may quickly be switched from cutting one type of module to another. As shown there is a different pin arrangement and even a different number of pins used to precisely locate the module with respect to the cutting slot 104 of the die. However, other than the gap for receiving the module, the number of pins, and the pin locations, the operation of the die of FIGS. 6A and 6B is the same as that for the die previously discussed with respect to the dies used with modules of the type shown in FIGS. 5A and 5B. In addition, there is alignment boss 150 which is received by the central groove 152 in the module of FIG. 4A. Alignment boss 150 illustrates that instead of using pins for alignment, a "negative image" of the module structure (somewhat similar to the injection mold used to manufacture the modules) or a combination of pins and "negative" structure could be used to cooperate with the structure characteristic of the module.

Figure 7:
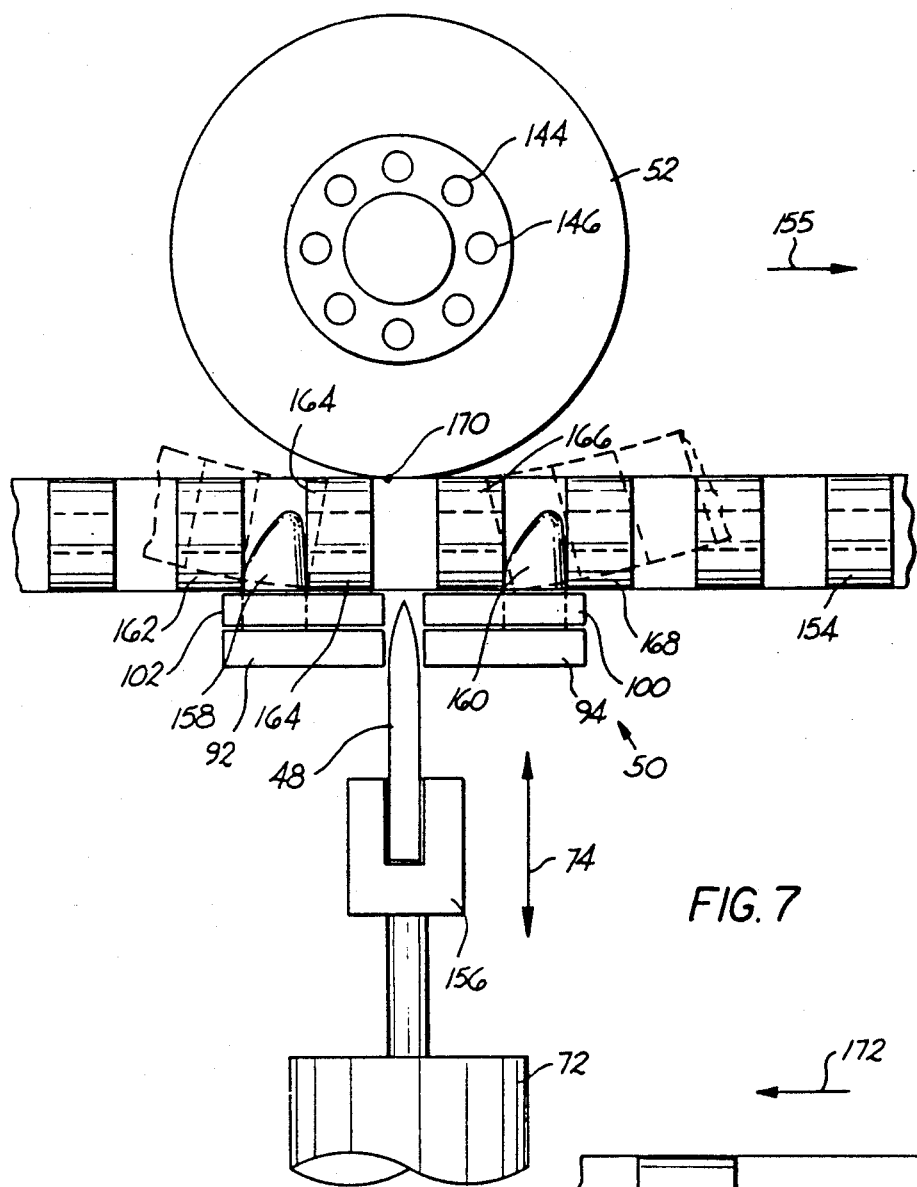
FIG. 7 shows an end view of the alignment die and anvil with a module in place during the cutting process.

Referring now to FIG. 7 there is an end view showing the alignment die 50 in place with respect to the cutting blade 48, the module 154, such as the module shown in FIG. 2 and the cylindrical shaped anvil 52. Movement of the modules through the apparatus is in the direction indicated by arrow 155. As seen, hydraulic damped pneumatic cylinder 72 is suitable for moving the blade 48 and the structure 156 which connects the cylinder 72 to the blade 48 in reciprocating directions as indicated by double-headed arrow 74. Although not shown, for most blades, support structure 156 should extend around the blade on all sides except the cutting edge. From FIG. 7 it can also be seen how the alignment pins 158 and 160 are designed to operate in conjunction with the link structure 162-164 and 166-168 respectively to precisely position the module prior to being cut by blade 48. During the cutting process as the hydraulic cylinder 72 drives blade 48 into the module, it can be seen that anvil 52 provides a line of support 166 across the module. Also as shown, it should be noted that the module tends to flex around the curvature of the anvil 52 during the cutting process. The dashed lines of FIG. 7 shows blade 48 in the process of cutting, and the flexing of the module in an exaggerated condition. Allowing the module to flex around the anvil such as shown by the dashed lines in FIG. 7 has been found to be very important in preventing uneven or jagged fracturing and breaking of the module during the cutting process. It has also been found that for some modules the blade 48 should be shaped with a very narrow or fine cutting edge, whereas other styles of modules receive a better cut if the blade is shaped with a rather blunt edge. Further, it has been found that some types of modules receive a cleaner cut if slightly heated prior to being cut, whereas other types of modules cut better when cold.

Figure 7A:
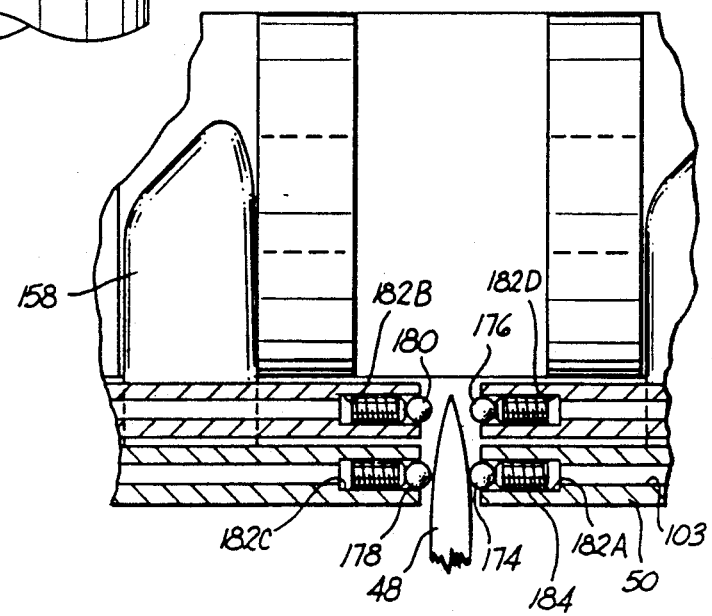
FIG. 7A is a blow-up view showing the position of the cutting blade and how the alignment pins position the module accurately prior to cutting.

Referring now to FIG. 7A, it can be seen that the locator pins, such as pin 158, are beveled such that as they contact the module to be cut, they tend to bias or move the module a slight amount in the direction opposite to the feed direction as is indicated by arrow 172. According to a first embodiment, the modules are fed or provided to the cutting station so that there is always a slight over-shoot. Thus to counteract the over-shoot, the module to be cut must be moved slightly backward as indicated by arrow 172 into the proper position for cutting. The over-shoot and subsequent retraction is used to leave a gap between the module being cut and mechanical stop 68.

According to the preferred embodiment, the precise alignment between cutting blade 48 and the alignment die 50 is achieved by ceramic balls such as ceramic balls 174, 176, 178 and 180 being pressed into bores of the same dimension, such as bore 182, located in the top and bottom plates. Set screws, such as set screw 184 are then used to force the ceramic ball out of the bore such that they substantially contact the cutting blade 48 and act as ceramic bearings. The set screws are adjusted by means of the adjustment bores, such as adjustment bore 103 discussed with respect to FIG. 5A.

Thus although there has been described to this point particular embodiments of the apparatus and method for quickly and accurately cutting conveyor belt modules, it is not intended that such references be considered as limitations upon the scope of ths invention except insofar as is set forth in the following claims.

What is claimed is:

1. Apparatus for cutting conveyor belt modules to a selected width comprising in combination,
    means for feeding modules past a cutting site to position them with said selected width of the modules extending beyond the cutting site,
    a movable cutting blade positioned to enter one surface of the modules to cut off said selected width froms aid module,
    a curved anvil surface contacting a surface of said modules opposite the cutting blade tangentially at a cutting line through the module to permit flexing of respective module parts on opposite sides of the blade in response to cutting action,
    and means for moving the cutting blade through the modules at the cutting site in mating position with the cutting line on the modules defined by the anvil surface.

2. Apparatus for cutting conveyor belt modules to a selected width comprising:
    a guide track for providing a travel path past a cutting location for modules to be cut;
    means for stopping said modules after a selected amount of width of said module has passed said cutting location;
    a cutting blade having a length extending orthogonal to the direction of travel of said modules;
    an alighment die to provide a guide for said cutting blade and to position said modules prior to cutting;
    activating means for moving said blade at a controlled speed for cutting through said modules;
    an anvil located substantially across the length of the modules to be cut so as to provide support by contact with said modules along a line of support directly opposite the length of said blade as said blade cuts through said modules, said anvil having a shape such that, as said blade cuts through said modules, contact between said anvil and said modules decreases from said line of support in both directions along the travel path.

3. The apparatus of claim 2 wherein said anvil includes at least a portion which has a cylindrical shape and wherein the axis of said cylindrical shape is orthogonal to the direction of travel of said modules.

4. The apparatus of claim 3 wherein said cylindrical portion of said anvil may be rotated around its axis such that different areas along said cylindrical shape provides said line of support as said modules are cut.

5. The apparatus of claim 2 and further including at least one sensing means for monitoring the amount of width of said modules which moves past said cutting location.

6. The apparatus of claim 5 wherein said sensing means is an optical sensor.

7. The apparatus of claim 5 further comprising means causing said sensing means and said means for stopping to cooperate such that said cutting blade cuts through a single module at two locations to produce three portions of said single module, each of said three portions having selected lengths.

8. The apparatus of claim 2 and further including a drive means to control the speed of modules moving along said guide track.

9. The apparatus of claim 8 wherein said drive means includes a friction wheel which pinches modules to be cut between said guide track and said friction wheel, said friction wheel connected to and powered by a reversible motor.

10. The apparatus of claim 9 wherein said motor includes two forward speeds.

11. The apparatus of claim 2 including means disposing said guide track at a selected angle with respect to a horizontal position such that modules to be cut move toward said cutting location at a speed dependent on said selected angle and gravity.

12. The apparatus of claim 11 wherein said angle of said guide track is between about 18° and 30° to provide said speed.

13. The apparatus of claim 2 wherein said alignment die is selectable according to the type of module to be cut.

14. The apparatus of claim 13 wherein said alignment die includes locator pins which cooperate with characteristics of said module so as to move and precisely locate said module prior to cutting.

* * * * *